United States Patent

Okuda et al.

(10) Patent No.: US 9,673,639 B2
(45) Date of Patent: Jun. 6, 2017

(54) RECHARGEABLE BATTERY SYSTEM INCLUDING CONTROLLER AND BATTERY BACKS IN DAISY CHAIN COMMUNICATION PATH

(71) Applicant: SANYO ELECTRIC CO., LTD., Osaka (JP)

(72) Inventors: Yasuo Okuda, Kyoto (JP); Kazuaki Okamoto, Chiba (JP); Yousuke Ohtsuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 14/633,628

(22) Filed: Feb. 27, 2015

(65) Prior Publication Data

US 2015/0280463 A1 Oct. 1, 2015

(30) Foreign Application Priority Data

Mar. 28, 2014 (JP) .................................. 2014-070329

(51) Int. Cl.
*H02J 7/00* (2006.01)
*H01M 10/42* (2006.01)

(52) U.S. Cl.
CPC .......... *H02J 7/0013* (2013.01); *H02J 7/0021* (2013.01); *H01M 10/4257* (2013.01); *H01M 2010/4278* (2013.01); *H02J 2007/0098* (2013.01)

(58) Field of Classification Search
CPC .................................................... Y02E 60/12
(Continued)

(56) References Cited

U.S. PATENT DOCUMENTS 6,555,264 B1 * 4/2003 Hamada .............. H01M 2/0245
429/149
6,818,343 B1 * 11/2004 Kimoto ............... H01M 2/1016
429/120
(Continued)

FOREIGN PATENT DOCUMENTS

EP 2899556 A1 7/2015
JP 2002-110259 * 4/2002
(Continued)

OTHER PUBLICATIONS

European Search Report EP Application No. 15 15 7398 dated Aug. 6, 2015.

*Primary Examiner* — Yalkew Fantu
(74) *Attorney, Agent, or Firm* — McDermott Will & Emery LLP

(57) ABSTRACT

A rechargeable battery management unit (controller) controls a plurality of battery packs. A communication path connects the rechargeable battery management unit and the plurality of battery packs in a daisy chain for packet communication and representing a ring topology. The rechargeable battery management unit sends a fixed-length packet divided into segments so as to flow in one direction on the management data communication path, the number of segments being equal to or more than the number of battery packs. Each of the plurality of battery packs stores data related to the battery pack in a segment assigned to the battery pack in the fixed-length packet received from a battery pack preceding in the management data communication path and sends the fixed-length packet to a succeeding battery pack.

5 Claims, 7 Drawing Sheets

(58) Field of Classification Search
USPC .......................................................... 320/112
See application file for complete search history.

(56) References Cited

U.S. PATENT DOCUMENTS

| | | | |
|---|---|---|---|
| 2002/0140401 A1* | 10/2002 | Watanabe | H01M 2/22 320/134 |
| 2003/0132732 A1* | 7/2003 | Thomas | H02H 9/042 320/134 |
| 2004/0021442 A1* | 2/2004 | Higashino | H01M 10/0413 320/112 |
| 2006/0257728 A1* | 11/2006 | Mortensen | H01M 2/1653 429/144 |
| 2009/0027009 A1 | 1/2009 | Sivertsen | |
| 2010/0286938 A1 | 11/2010 | Kaneko | |
| 2013/0187610 A1 | 7/2013 | Hayashi et al. | |

FOREIGN PATENT DOCUMENTS

| | | |
|---|---|---|
| JP | 2002-110259 A | 4/2002 |
| JP | 2011-078201 A | 4/2011 |

* cited by examiner

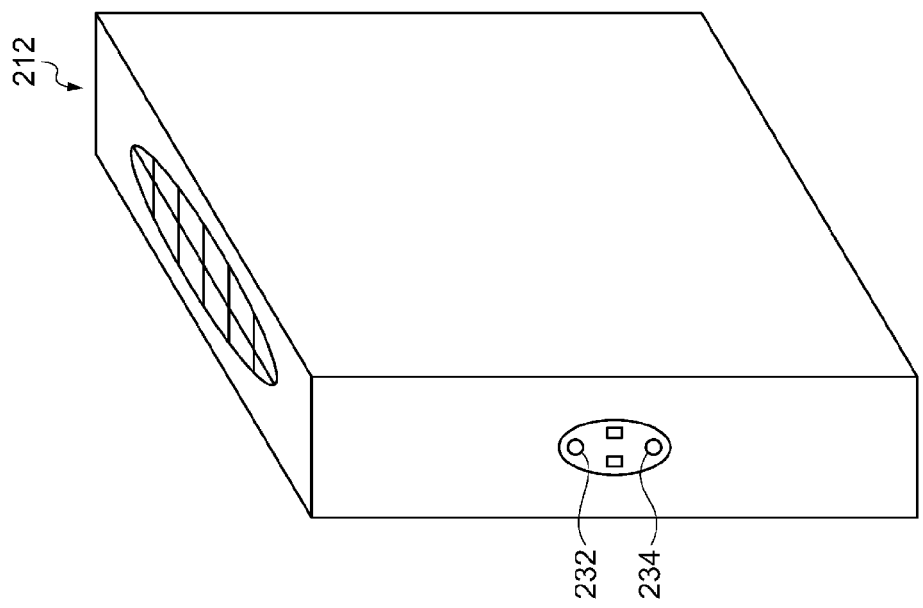
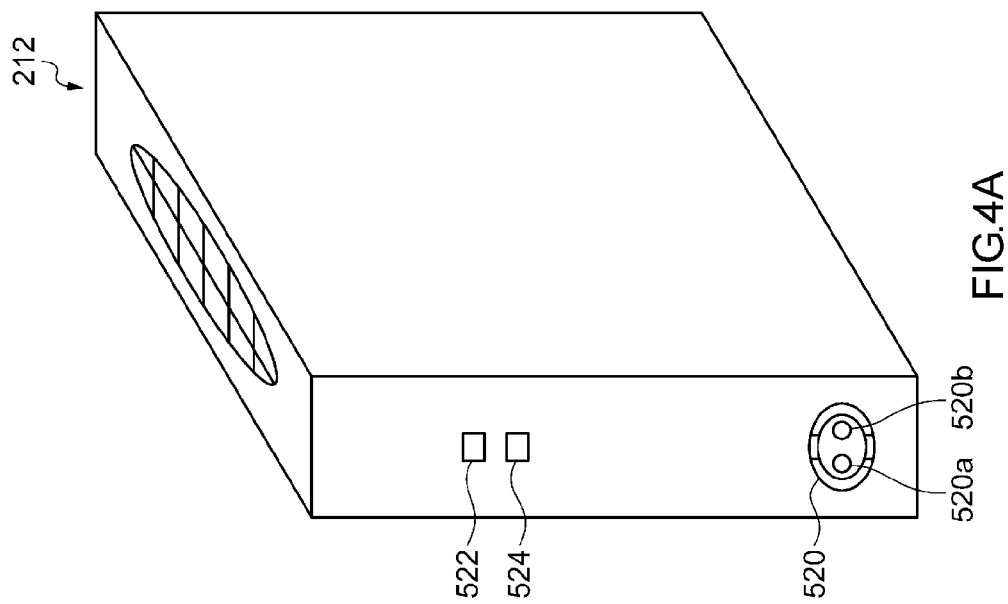

CONVERSION RULE
0 → 01
1 → 10

EXAMPLE OF CONVERSION
1011 → 10011010

FIG.7A

CONVERSION RULE
0 → 1
1 → 0

EXAMPLE OF CONVERSION
1011 → 0100 → 10110100

| | FIRST CYCLE | SECOND CYCLE | THIRD CYCLE | FOURTH CYCLE | FIFTH CYCLE |
|---|---|---|---|---|---|
| 212a | (a1,b0,c0), | (a2,b1,c1), | (a3,b2,c2), | (a4,b3,c3), | (a5,b4,c4) |
| 212b | (a1,b1,c0), | (a2,b2,c1), | (a3,b3,c2), | (a4,b4,c3), | (a5,b5,c4) |
| 212c | (a1,b1,c1), | (a2,b2,c2), | (a3,b3,c3), | (a4,b4,c4), | (a5,b5,c5) |

RECHARGEABLE BATTERY SYSTEM INCLUDING CONTROLLER AND BATTERY BACKS IN DAISY CHAIN COMMUNICATION PATH

This application is based upon and claims the benefit of priority from the prior Japanese Patent Application No. 2014-070329, filed on Mar. 28, 2014, the entire contents of which are hereby incorporated by reference.

BACKGROUND OF THE INVENTION

1. Field of the Invention

The present invention relates to a rechargeable battery system.

2. Description of the Related Art

Rechargeable battery systems provided with a plurality of battery packs including rechargeable battery cells are known. Rechargeable battery systems provided with a plurality of battery packs including rechargeable battery cells are known. The rechargeable battery systems are provided with communication functions for managing the battery packs (see, for example, Japanese Unexamined Publication No. JP2011-78201).

In a rechargeable battery system like this, a large number of rechargeable batteries are assembled for use. The plurality of batteries may be connected in series to provide a large capacity and a large output. Physical properties such as the temperature, voltage, electrical energy, etc. of the battery packs are collected in order to manage the larger number of battery packs assembled.

Generally, the larger the data volume of physical parameters used for management of battery packs, the larger the electric power required for communication thereof. Given that the electric power required for data communication used for management of rechargeable batteries is provided by the rechargeable batteries, power consumption of the rechargeable batteries forming the rechargeable battery system may be unbalanced if data that should be communicated is concentrated on a particular rechargeable battery.

The present invention addresses this issue and a purpose thereof is to provide a method of leveling power consumption in battery packs where rechargeable batteries are connected in series.

SUMMARY OF THE INVENTION

The battery system according to an embodiment of the present invention that addresses the aforementioned challenge comprises: a plurality of battery packs; a controller that controls the plurality of battery packs; and a communication path connecting the controller and the plurality of battery packs in a daisy chain for packet communication and representing a ring topology. The controller sends a fixed-length packet divided into segments so as to flow in one direction on the communication path, the number of segments being equal to or more than the number of battery packs, and each of the plurality of battery packs stores data related to the battery pack in a segment assigned to the battery pack in the fixed-length packet received from a battery pack preceding in the communication path and sends the fixed-length packet to a succeeding battery pack.

The controller may send to the communication path a fixed-length packet in which dummy data is stored in a segment.

Each of the plurality of battery packs may generate the data related to the battery pack by combining a bit that should be transmitted and a bit obtained by inverting the bit that should be transmitted.

The controller may send data recorded in the fixed-length packet returned from the plurality of battery packs via the communication path to the communication path as the dummy data in the subsequent fixed-length packet.

BRIEF DESCRIPTION OF THE DRAWINGS

The figures depict one or more implementations in accordance with the present teaching, by way of example only, not by way of limitations. In the figures, like reference numerals refer to the same or similar elements.

Embodiments will now be described, by way of example only, with reference to the accompanying drawings which are meant to be exemplary, not limiting, and wherein like elements are numbered alike in several Figures, in which:

FIGS. 4A-4B are perspective views schematically showing the appearance of the battery pack according to the embodiment;

FIGS. 7A-7B show rules for converting the data generated by the battery pack and examples of conversion; and FIG. 8 schematically shows the data transmitted by the battery pack in which past fixed-length packets are used as dummy data.

DETAILED DESCRIPTION OF THE INVENTION

The invention will now be described by reference to the preferred embodiments. This does not intend to limit the scope of the present invention, but to exemplify the invention.

Figure 1:
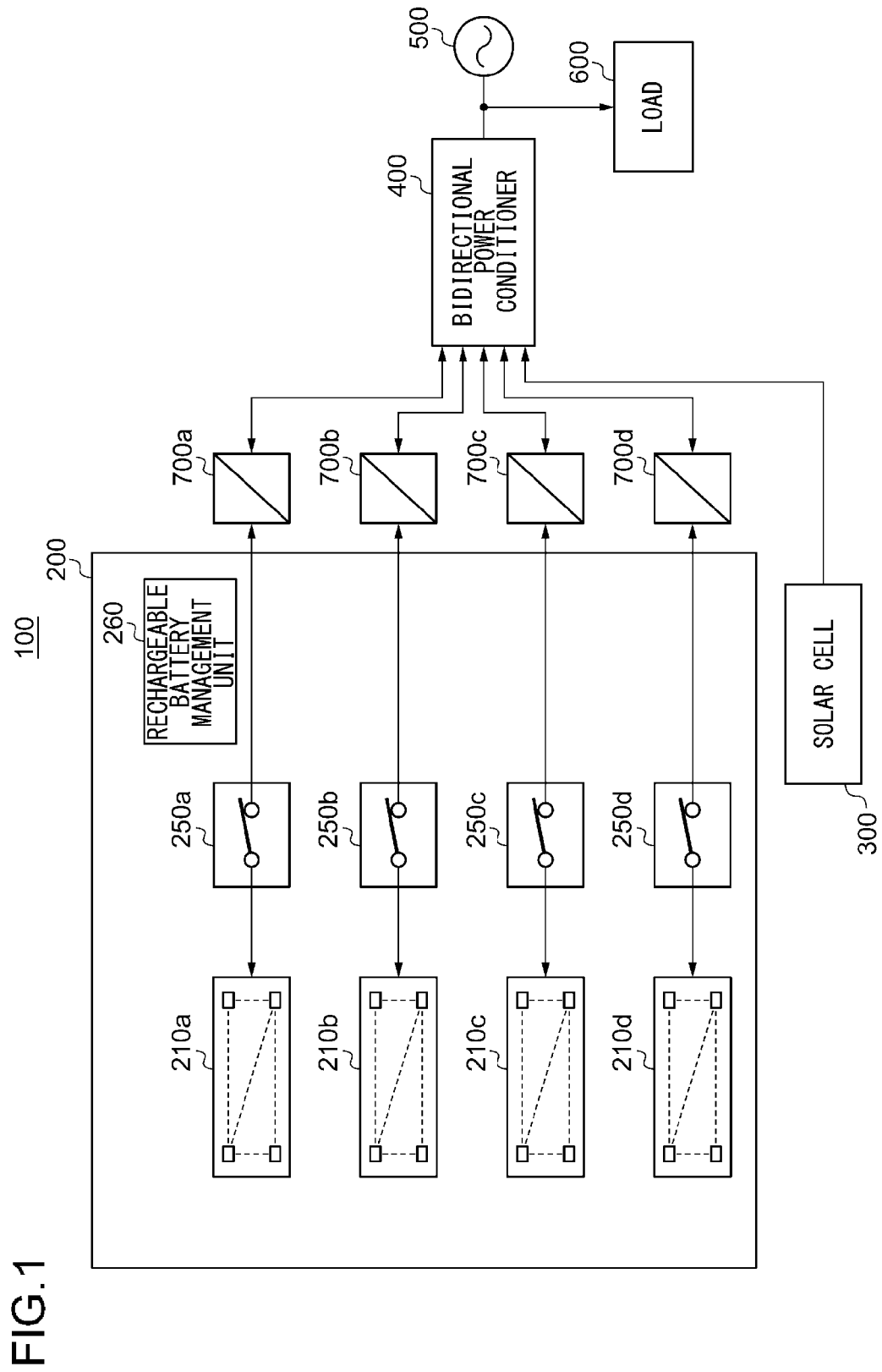
FIG. 1 schematically shows a power distribution system according to an embodiment of the present invention.

FIG. 1 schematically shows a power distribution system 100 according to an embodiment of the present invention. The power distribution system 100 according to the embodiment includes a rechargeable battery container 200 including a plurality of rechargeable batteries, a solar cell 300 (a renewable energy power generator), a bidirectional power conditioner 400, a commercial power supply 500, a load 600, and a DC/DC converter 700.

The commercial power supply 500 is an AC power supply for supplying power from a utility company. The solar cell 300 is a power generator for directly converting light energy into power using photovoltaic effect. A silicon solar cell, a solar cell formed by any of various compound semiconductors, a dye-sensitised solar cell (organic solar cell), etc. is used as the solar cell 300. The power distribution system 100 may be provided with a fuel cell or a wind power generator (not shown) instead of or in addition to the solar cell 300. A wind power generator normally generates AC power. Therefore, if the power distribution system 100 is provided with a wind power generator, an AC/AC converter (not shown) is provided in a stage preceding the bidirectional power conditioner 400.

The bidirectional power conditioner 400 is connected at one end to the rechargeable battery container 200 and the solar cell 300. The bidirectional power conditioner 400 is also connected at the other end to the commercial power supply 500. The bidirectional power conditioner 400 is provided with a bidirectional inverter (not shown). The inverter converts the DC power generated by the solar cell 300 or the DC power discharged by the rechargeable battery container 200 into AC power and converts the AC power from the commercial power supply 500 into DC power. A DC/DC converter 700a is provided in the conducting path between a switch module 250a and the bidirectional power conditioner 400. A DC/DC converter 700b is provided in the electrically-conducting path between a switch module 250b and the bidirectional power conditioner 400. Similarly, a DC/DC converter 700c is provided between a switch module 250c and the bidirectional power conditioner 400, and a DC/DC converter 700d is provided between a switch module 250d and the bidirectional power conditioner 400. Hereinafter, the DC/DC converters 700a through 700d will be generically referred to as "DC/DC converters 700" except when distinction is indicated. The DC/DC converters 700 step up or step down the DC power converted by the bidirectional power conditioner and cause the plurality of rechargeable batteries to charge or discharge power.

The rechargeable battery container 200 is provided with a plurality of rechargeable battery units 210 each including a predetermined number of battery packs. In the example shown in FIG. 1, 4 rechargeable battery units 210, i.e., rechargeable battery units 210a through 210d, are shown. Hereinafter, the rechargeable battery units 210a through 210d will be generically referred to as "rechargeable battery units 210" except when distinction is indicated. The rechargeable battery container 200 is provided with a rechargeable battery management unit (Battery Management Unit; BMR) 260 for managing the battery packs provided in the rechargeable battery units 210. The rechargeable battery container 200 also includes switch modules 250a through 250d capable of disconnecting the conducting path between the rechargeable battery units 210a through 210d and the rechargeable battery management unit 260.

The switch module 250a is provided in the conducting path between the rechargeable battery unit 210a and the DC/DC converter 700a, and the switch module 250b is provided in the conducting path between the rechargeable battery unit 210b and the DC/DC converter 700b. Similarly, the switch module 250c is provided between the rechargeable battery unit 210c and the DC/DC converter 700c, and the switch module 250d is provided between the rechargeable battery unit 210d and the DC/DC converter 700d. Hereinafter, the switch modules 250a through 250d will be generically referred to as "switch modules 250" except when distinction is indicated.

The rechargeable battery management unit 260 according to the embodiment manages the operation of the plurality of rechargeable battery units 210 and the switch modules 250. The rechargeable battery management unit 260 builds a rechargeable battery system 240 from one rechargeable battery unit 210 and one switch module 250.

Figure 2:
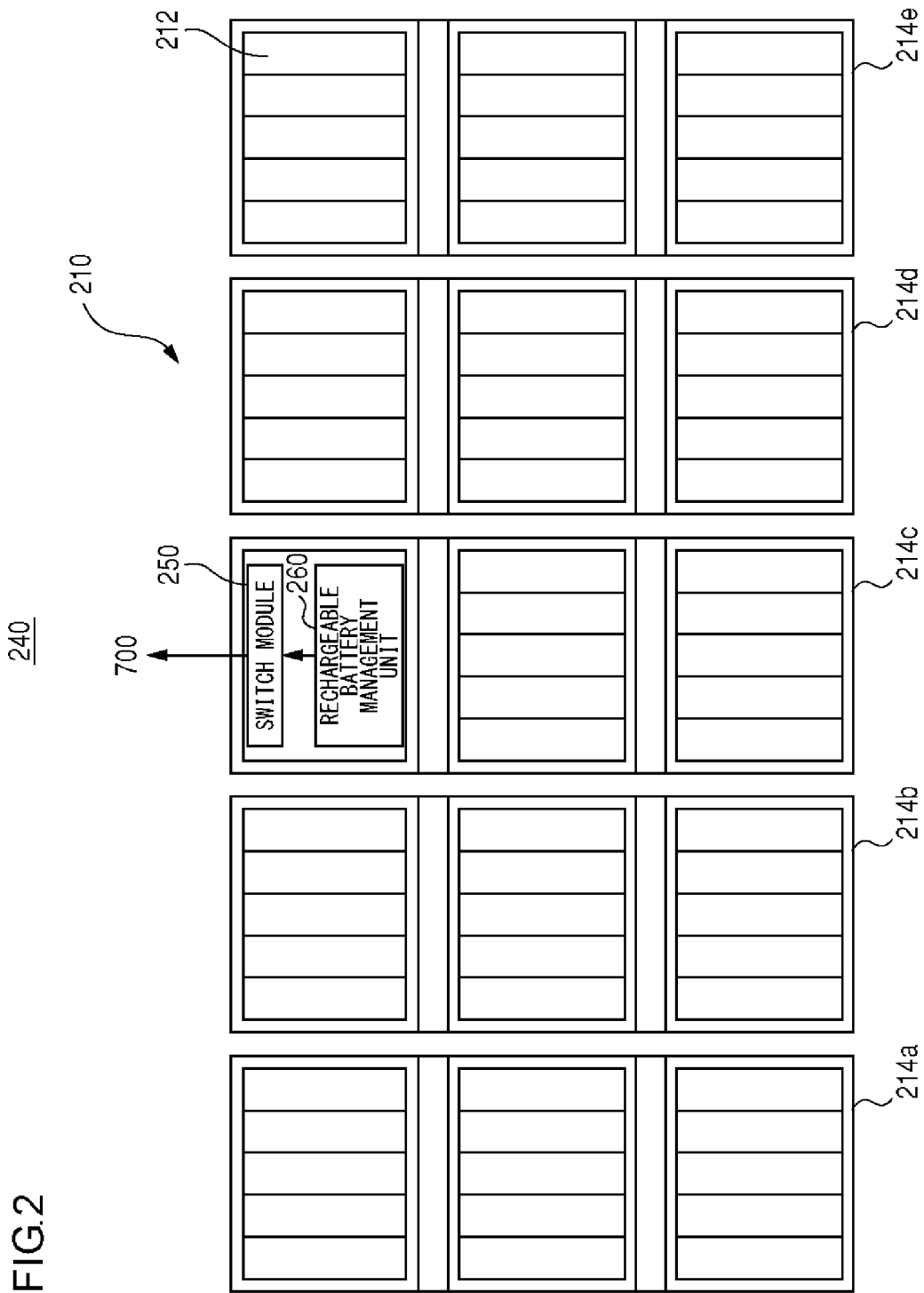
FIG. 2 schematically shows an exemplary appearance of the rechargeable battery system according to the embodiment.

FIG. 2 schematically shows an exemplary appearance of the rechargeable battery system 240 according to the embodiment. The rechargeable battery system 240 is provided with the rechargeable battery unit 210, the switch module 250, and the rechargeable battery management unit 260. The rechargeable battery unit 210 includes 70 battery packs 212. Each battery pack 212 is a rechargeable secondary battery. The battery pack 212 is implemented by, for example, a lithium ion secondary battery. The battery pack 212 is provided with a plurality of rechargeable battery cells described later.

The battery pack 212 is charged by the power of the commercial power supply 500 converted into DC power by the bidirectional power conditioner 400. The rechargeable battery management unit 260 measures various physical parameters such as the state of charge (SOC) and temperature of the battery packs 212 and provides the measured physical parameters to the bidirectional power conditioner 400. The rechargeable battery management unit 260 also performs other type of control. For example, the rechargeable battery management unit 260 controls a fan (not shown) to cool the battery packs 212. In this sense, the rechargeable battery management unit 260 functions as a controller for controlling the battery packs 212.

Referring to FIG. 2, the rectangle denoted by numeral 212 represents a single battery pack 212. For brevity, not all of the battery packs 212 are labeled with a reference numeral. Rectangles similar to the rectangle denoted by numeral 212 all represent battery packs 212. As shown in FIG. 2, the rechargeable battery unit 210 is provided with 5 battery pack racks 214, i.e., battery pack racks 214a through 214e. Vertically, each battery pack rack 214 is provided with 3 accommodating spaces each capable of accommodating 5 battery packs 212. Therefore, one battery pack rack 214 is capable of accommodating a maximum of 5×3=15 battery packs. One of the accommodating spaces provided in the battery pack rack 214c of the rechargeable battery unit 210 according to the embodiment accommodates the switch module 250 and the rechargeable battery management unit 260 instead of the battery packs 212. Therefore, a total of 14×5=70 battery packs 212 are accommodated.

Each battery pack 212 according to the embodiment is capable of charging 1.8 kWh electric energy. Therefore, the electric energy of the rechargeable battery unit 210 as a whole is 1.8 kWh×70=126 kWh. Since the rechargeable battery container 200 is provided with 4 rechargeable battery units 210, the power distribution system 100 according to the embodiment charges 126 kWh×4=540 kWh electric energy as a whole. The solar cell 300 generates 250 kW power.

Figure 3:
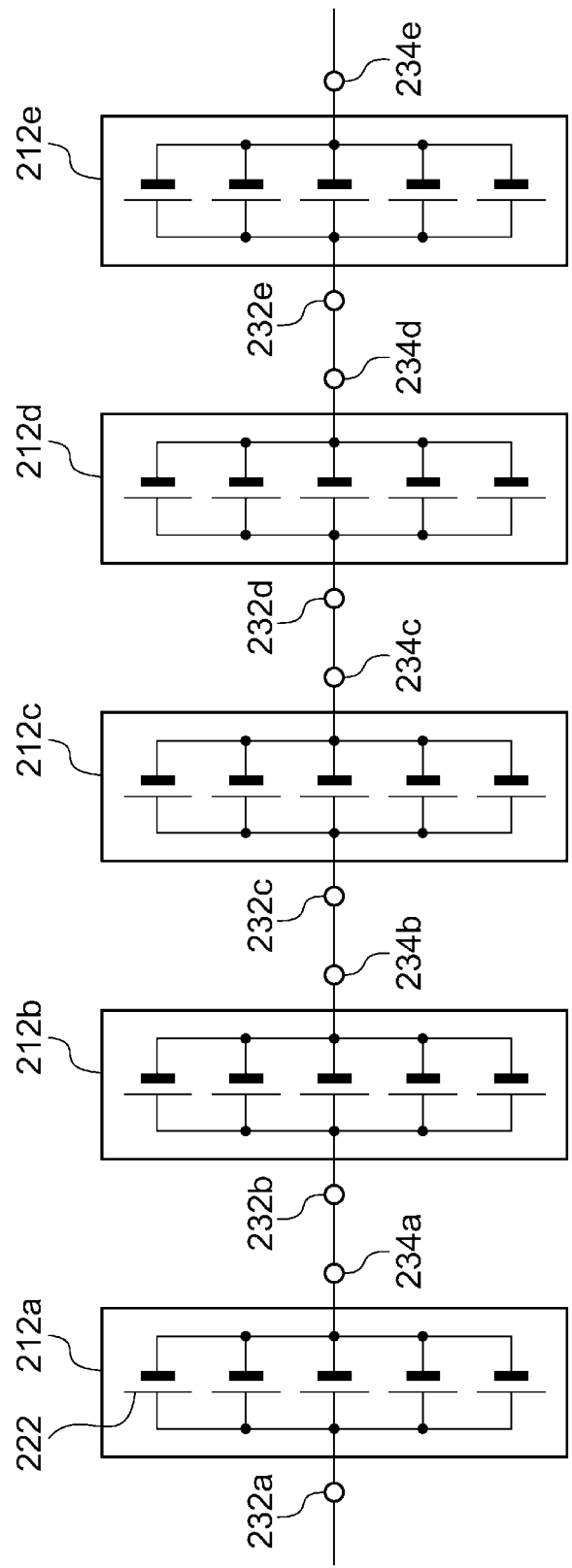
FIG. 3 schematically shows 5 battery packs connected in parallel.

FIG. 3 schematically shows 5 battery packs 212a-212e connected in series. FIG. 3 shows the battery packs 212 accommodated in one accommodating space in the battery pack rack 214 shown in FIG. 2. As shown in FIG. 3, the battery pack 212a is provided with a positive electrode terminal 232a and a negative electrode terminal 234b. Similarly, the battery packs 212b-212e are provided with positive electrode terminals 232b-232e and negative electrode terminals 234b-234e, respectively.

The negative electrode terminal 234a of the battery pack 212a is connected to the positive electrode terminal 232b of the battery pack 212b. The negative electrode terminal 234b of the battery pack 212b is connected to the positive electrode terminal 232c of the battery pack 212c. Similarly, the 5 battery packs 212a-212e are connected in series.

Referring to FIG. 3, each battery pack 212 is provided with 5 rechargeable battery cells 222 but not all of the battery cells are labeled with a reference numeral for brevity. The battery pack 212 is built by connecting the 5 rechargeable battery cells 222 in parallel. The number of rechargeable battery cells 222 provided in the battery pack 212 may be 4 or less or 6 or more.

FIGS. 4A-4B are perspective views schematically showing the appearance of the battery pack 212 according to the embodiment. More specifically, FIG. 4A is a front perspective view of the battery pack 212, and FIG. 4B is a rear perspective view of the battery pack 212.

As shown in FIGS. 4A-4B, the battery pack 212 is provided with a vent 526 on the upper surface thereof. The battery pack 212 is also provided with a vent on the bottom surface thereof (not shown). This allows air to flow in the battery pack 212 to cool the battery pack 212.

As shown in FIG. 4A, the front panel of the battery pack 212 is provided with a first LED (Light Emitting Diode) 522 and a second LED 524 used to indicate the status of the battery pack 212. The first LED 522 flashes green when the battery pack 212 is normally communicating with the rechargeable battery management unit 260 or other battery packs 212. The second LED 524 is lighted red in the event that the battery pack 212 is in trouble for some reason.

The front panel of the battery pack 212 is also provided with an optical fiber connector 520. The optical fiber connector 520 includes a first optical fiber connector 520a and a second optical fiber connector 520b, which are connected to a light receiving module and a light transmitting module, respectively. The light receiving module and the light transmitting module are housed in the casing of the battery pack 212.

As shown in FIG. 4B, the positive electrode terminal 232 and the negative electrode terminal 234 described with reference to FIG. 3 are provided on the rear surface of the battery pack 212.

The above description of the rechargeable battery system 240 according to the embodiment primarily concerns the conducting path. A description will now be given of a management data communication path for transmitting management data for managing the battery packs 212 forming the rechargeable battery unit 210.

For the purpose of managing the battery packs 212, the rechargeable battery management unit 260 measures various physical parameters such SOC and temperature of the battery packs 212. The rechargeable battery management unit 260 and the battery packs 212 are connected by a management data communication path different from the power supply line.

Figure 5:
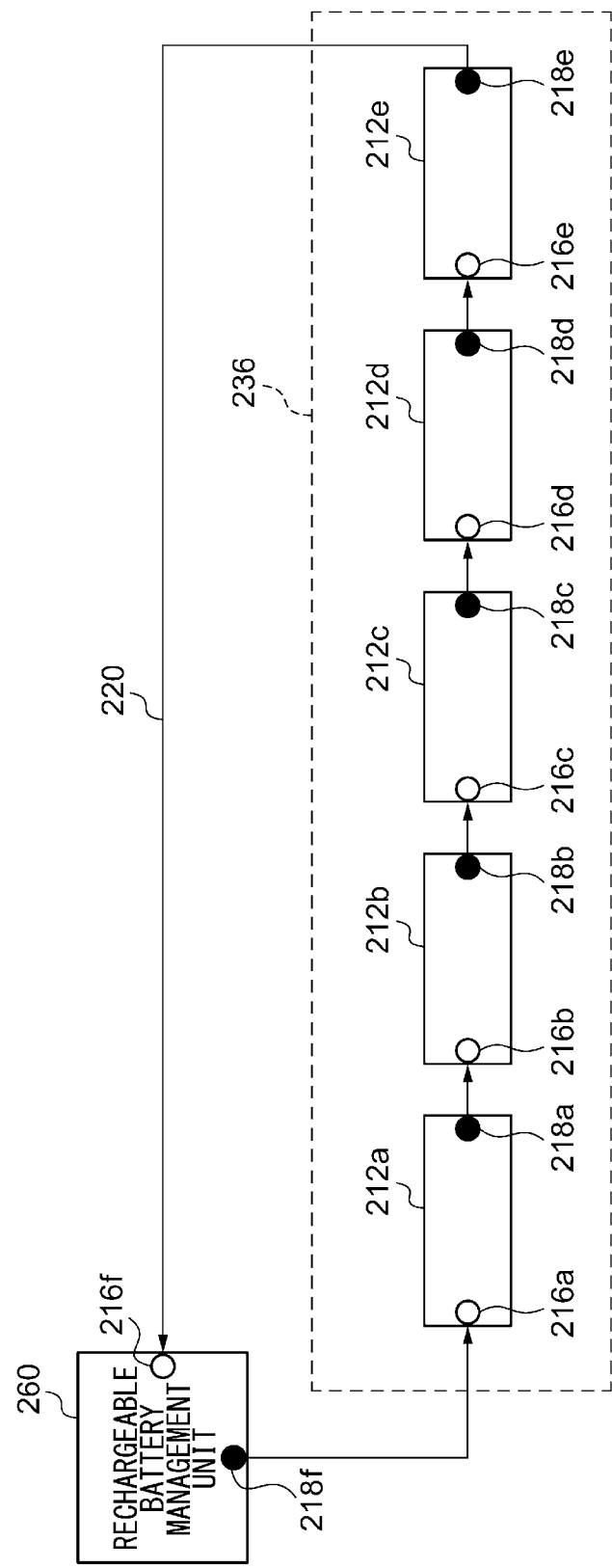
FIG. 5 schematically shows an example of the management data communication path.

FIG. 5 schematically shows an example of the management data communication path 220. As shown in FIG. 5, the rechargeable battery management unit 260 retrieves the management data for the battery packs 212. 5 battery packs 212 being defined as a minimum unit of management. The management data communication path 220 is a communication path connecting the rechargeable battery management unit 260 and a rechargeable battery group 236 including the 5 battery packs 212. Each of the rechargeable battery management unit 260 and the battery packs 212 is provided with a pair of a light receiving module 216 and a light transmitting module 218. Referring to FIG. 5, the battery pack 212a is provided with a light receiving module 216a and a light transmitting module 218a, and the battery pack 212b is provided with a light receiving module 216b and a light transmitting module 218b. The battery packs 212c, 212d, and 212e are similarly configured. The rechargeable battery management unit 260 is provided with a light receiving module 216f and a light transmitting module 218f. The modules are generically referred to as light receiving modules 216 and light transmitting modules 218 except when distinction is indicated.

The management data communication path 220 is implemented by an optical fiber. The rechargeable battery management unit 260 communicates with the battery packs 212 using a predefined communication protocol. A unique address is assigned to each of the battery packs 212 according to the embodiment. The rechargeable battery management unit 260 can identify the respective rechargeable batteries using the address. The rechargeable battery management unit 260 links the address for identifying the battery pack 212 with a command for identifying the physical parameter sought to be retrieved, in accordance with the predefined communication protocol, and transmits the resultant management data the management data communication path 220.

When the rechargeable battery management unit 260 transmits the management data to the management data communication path, the battery pack 212 corresponding to the address included in the management data turns the information related to the battery pack 212 (e.g., the physical parameter corresponding to the command included in the management data) into data and transmits the resultant data to the management data communication path 220. This allows the rechargeable battery management unit 260 to retrieve the desired physical parameter of a designated battery pack 212. Thus, the term "management data", used in this specification, for managing the battery packs 212 means data that links an address for identifying the battery pack 212 with a command for identifying a physical parameter sought to be retrieved, in accordance with a predefined communication protocol, and data for the physical parameter transmitted by the battery pack 212 in response to the command.

The light transmitting module 218 implements data transmission by lighting a communication LED (not shown). As shown in FIG. 5, the light transmitting module 218 and the light receiving module 216 of the adjacent battery packs 212 in a series connection are connected by an optical fiber. Further, the light transmitting module 218f provided in the rechargeable battery management unit 260 is connected by an optical fiber to the light receiving module 216a provided in the first battery pack 212a. The light transmitting module 218e provided in the fifth battery pack 212e is connected by an optical fiber to the light receiving module 216f provided in the rechargeable battery management unit 260. This allows the battery packs 212 and the rechargeable battery management unit 260 to be connected by the optical fibers in a daisy chain, thereby forming the management data communication path 220.

When the battery pack 212 receives the management data that flows through the management data communication path 220, the battery pack 212 refers to the address in the management data and checks it against the address assigned to the battery pack 212. If the addresses match, the battery pack 212 runs the command included in the management data and transmits data for the result to the management data communication path 220 along with the received management data. If the addresses do not match, the battery pack 212 transmits the received management data intact to the management data communication path 220.

It will be assumed that the rechargeable battery management unit 260 transmits, to the management data communication path 220, management data including the address for identifying the battery pack 212b in the rechargeable battery group 236 and a command requiring transmission of temperature data for the battery pack 212b, in order to retrieve temperature data for the battery pack 212b. Referring to the management data communication path 220 shown in FIG. 5, the battery pack 212a located between the rechargeable battery management unit 260 and the battery pack 212b, i.e., located upstream of the battery pack 212b, transmits the received management data intact to the management data communication path 220 Meanwhile, the battery packs 212c, 212d, and 212e located downstream of the battery pack 212b, transmits the temperature data for the battery pack 212b (response from the battery pack 212b) in addition to the management data transmitted by the rechargeable battery management unit 260.

Figure 6A:
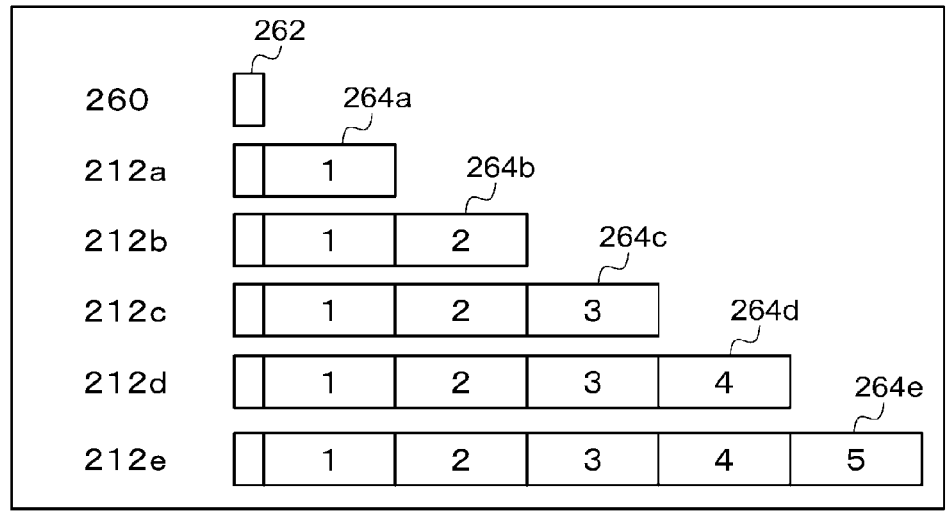
FIGS. 6A-6B schematically show transition of the volume of data flowing in the management data communication path.
Figure 6B:
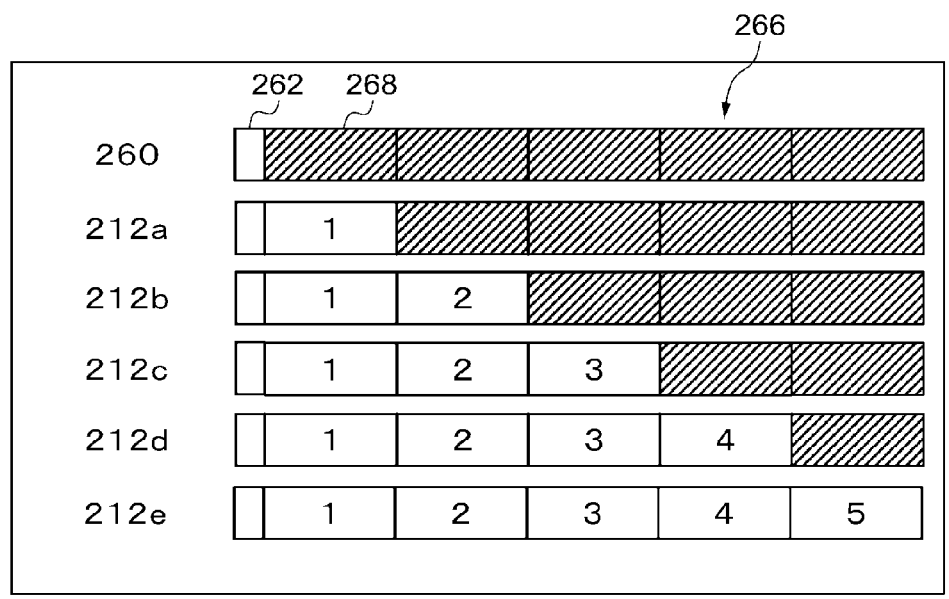

FIGS. 6A-6B schematically show transition of the volume of data flowing in the management data communication path 220. More specifically, FIG. 6A shows transition of the volume of data flowing in the management data communication path 220 according to a comparative example.

Each battery pack 212 runs a command included in the management data if the addresses included in the management data matches the address of the battery pack 212. It is assumed that the rechargeable battery management unit 260 on the management data communication path 220 shown in FIG. 5 requests all battery packs 212 located on the management data communication path 220 to transmit temperature data. FIG. 6A shows transition of the volume of data flowing in the management data communication path 220.

As shown in FIG. 6A, the rechargeable battery management unit 260 transmits a management data request command 262. The battery pack 212a responds to the management data request command 262, appends temperature 264a for the battery pack 212a to the management data request command 262, and transmits the resultant data. The battery pack 212b responds to the management data request command 262, appends temperature 264b for the battery pack 212b to the management data request command 262 and the temperature data 264a, and transmits the resultant data. Similarly, the battery pack 212c appends temperature 264c for the battery pack 212c to the management data request command 262, the temperature data 264a, and the temperature data 264b, and transmits the resultant data. The battery pack 212d appends temperature 264d for the battery pack 212d to the management data request command 262, the temperature data 264a, the temperature data 264b, and the temperature data 264c, and transmits the resultant data. The battery pack 212e appends temperature 264e for the battery pack 212e to the management data request command 262, the temperature data 264a, the temperature data 264b, the temperature data 264c, and the temperature data 264d, and transmits the resultant data.

Thus, in a ring of daisy chain connection of the management data communication path 220 starting at the rechargeable battery management unit 260 and configured such that data flows in one direction, the volume of data that should be communicated is larger downstream in the management data communication path 220 than upstream in the management data communication path 220. The power used for transmission and reception of the management data is supplied by the battery packs 212. Generally, the larger the volume of management data that should be transmitted or received, the larger the power required for transmission and reception. Therefore, in the management data communication path 220 in which the battery packs are strung together in a loop, starting at the rechargeable battery management unit 260, the battery packs 212 located downstream in the management data communication path 220 consume more power for communication of management data than the battery packs 212 located upstream.

Thus, the rechargeable battery system 240 according to the embodiment is configured such that power consumption is leveled among the battery packs 212 connected in a daisy chain on the management data communication path 220.

FIG. 6B shows transition of the volume of data flowing in the management data communication path 220 according to the embodiment. As shown in FIG. 6B, the rechargeable battery management unit 260 according to the embodiment sends a fixed-length packet 266 divided into segments to the management data communication path 220, the number of segments being equal to or more than the number of battery packs 212 included in the rechargeable battery group 236. Each segment of the fixed-length packet 266 is used to store data for the associated battery pack 212.

In the example shown in FIG. 6B, the fixed-length packet 266 is divided into 5 segments, which is equal to the number of battery packs 212 provided in the rechargeable battery group 236. The management data request command 262 is stored at the head of the fixed-length packet 266, which is followed by the segments assigned to store the data related to the battery packs 212a through 212e. In response to the management data request command 262, each battery pack 212 stores the data related to the battery pack 212 in the segment assigned to the battery pack 212 in the fixed-length packet 266 received from the battery pack 212 preceding in the management data communication path 220. After storing the data, the battery pack 212 transmits the fixed-length packet 266 to the succeeding battery pack 212.

By allowing the rechargeable battery management unit 260 to send the fixed-length packet 266 to the management data communication path 220, all of the battery packs 212 provided in the rechargeable battery group 236 constituting the management data communication path 220 transmit packets with the same volume of data. Consequently, power distribution in the battery packs 212 included in the rechargeable battery group 236 is leveled.

The data flowing in the management data communication path 220 is propagated through the communication path in the form of binarized data. More specifically, the battery packs 212 light the communication LED when the data forming the fixed-length packet 266 is "1" and turn off the communication LED when the data is "0". Thus, by converting the binary data into on/off states of the communication LED, the fixed-length packet 266 can be propagated through the management data communication path 220 implemented by an optical fiber.

Therefore, even if the data communicated by the battery packs 212 are of the same size, the power consumed for communication differs depending on whether the bit constituting the data is "0" or "1". In other words, bit "1" means that the power for lighting the communication LED is required and that more power is consumed for communication than in the case of bit "0".

Accordingly, the rechargeable battery management unit 260 inserts dummy data 268 in segments of the fixed-length packet 266 before sending the packet to the management data communication path 220. The rechargeable battery management unit 260 uses binary data in which the probability of occurrence of 0's and that of 1's are equal, as the dummy data. In FIG. 6B, the dummy data 268 is stored in the shaded segments. This can prevent variation in the power consumption due to the difference in combination of bits in the fixed-length packets 266 sent by the battery packs 212. This is because the physical data such as temperature data assumes various values so that the probability of occurrence of 0s in the bits constituting its binary data and that of 1's are considered to be identical.

Still alternatively, the battery packs 212 may generate data by combining bits that should be transmitted and bits obtained by inverting the bits that should be transmitted. A description will now be given of this variation.

FIGS. 7A-7B show rules for converting the data generated by the battery pack 212 and examples of conversion. FIG. 7A shows an example of combining bit 1 data with the inverted data to form the ultimate data. More specifically, if the bit that should be transmitted is 0, the battery pack 212 converts the data into "01". If the bit that should be transmitted is 1, the battery pack 212 converts the data into "10". For example, if the data that should be transmitted is a bit sequence "1011", the battery pack 212 converts the data into a bit sequence "10011010" according to the conversion rule mentioned above. This ensures that the probability of occurrence of 0s in the bit sequence constituting the data is equal to that of 1s.

FIG. 7B shows an example in which the bit sequence that should be transmitted is inverted and appended to the data that should be transmitted so as to generate the data. More specifically, the battery pack 212 generates inverted bits in which bit 0 that should be transmitted is converted into 1 and bit 1 is converted into 0. For example, given that the data that should be transmitted is "1011", the battery pack 212 generates inverted bits "0100". Further, the battery pack 212 appends the inverted bits "0100" to "1011" so as to generate a bit sequence "10110100". This ensures that the probability of occurrence of 0s in the bit sequence constituting the data is equal to that of 1s.

By performing the conversion process described above in the battery packs 212, it is ensured that the probability of occurrence of 0s in the bit sequence constituting the fixed-length packet 266 flowing in the management data communication path 220 is equal to that of 1s. Thus, the rechargeable battery management unit 260 uses the data recorded in the fixed-length packet returned from the battery packs 212 via the management data communication path 220 as the dummy data 268 of the fixed-length packet 266 subsequently sent. This eliminates the need for the rechargeable battery management unit 260 to generate the new dummy data 268 once the rechargeable battery management unit 260 sends the fixed-length packet 266 to the management data communication path 220. Therefore, the computational cost and power consumption can be reduced.

FIG. 8 schematically shows the data transmitted by the battery pack 212 in which past fixed-length packets 266 are used as dummy data 268. For brevity, FIG. 8 shows a case where the rechargeable battery group 236 is provided with three battery packs 212, i.e., the battery pack 212a, the battery pack 212b, and the battery pack 212c. Referring to FIG. 8, ai(i=1-5) denotes the data generated by the battery pack 212a in the i-th cycle. Similarly, bi(i=1-5) denotes the data generated by the battery pack 212b in the i-th cycle, and ci(i=1-5) denotes the data generated by the battery pack 212c in the i-th cycle. Of the initial values of the fixed-length packet 266, b0 and c0 denote dummy data stored in the segments assigned to the battery pack 212b and the battery pack 212c.

As shown in FIG. 8, in the first cycle, the battery pack 212a transmits b0 as the data for the battery pack 212b, but the battery pack 212b and the battery pack 212c transmit b1 as the data for the battery pack 212b. Thus, the combination of data transmitted by the battery pack 212a, the battery pack 212b, and the battery pack 212c differ depending on the cycle.

However, by allowing the past fixed-length packet 266 to be used for the dummy data 268, the battery pack 212a can use b1 as the data for the battery pack 212b in the second cycle. Thus, accumulating the data transmitted by the battery packs 212 in the time domain, the battery packs 212 end up transmitting the same data. In other words, power consumption in the battery packs 212 is leveled.

Therefore, by using the data recorded in the fixed-length packet 266 returned from the battery packs 212 as the dummy data 268 in the fixed-length packet 266 subsequently sent, the data conversion process described with reference to FIGS. 7A-7B is not required. The rechargeable battery management unit 260 can level power consumption in the battery packs 212 by transmitting intact the data recorded in the fixed-length packet 266 returned from the battery packs 212 via the management data communication path 220, as the dummy data 268 of the fixed-length packet 266 subsequently sent.

As described above, the rechargeable battery system 240 according to the embodiment is capable of leveling power consumption in the battery packs 212 connected in series.

In particular, power consumption by the battery packs 212 for communication is leveled without directly measuring the status of batteries (e.g., voltage of the battery packs 212). As a result, variation between the battery packs 212 is reduced.

Described above is an explanation based on an exemplary embodiment. The embodiment is intended to be illustrative only and it will be obvious to those skilled in the art that various modifications to constituting elements and processes could be developed and that such modifications are also within the scope of the present invention.

It is stated above that the number of battery packs 212 provided in the rechargeable battery group 236 is 5. Alternatively, 4 or less or 6 or more battery packs 212 may be provided. It is also stated above that the management data communication path 220 connects one rechargeable battery group 236, i.e., 5 battery packs 212, in a daisy chain. The number of battery packs 212 connected in a daisy chain is not limited to 5. More than 5 battery packs 212 may be connected across different rechargeable battery groups 236. While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A rechargeable battery system comprising:
a plurality of battery packs;
a controller that controls the plurality of battery packs; and
a daisy chain communication path formed by connecting the controller and the plurality of battery packs in series and a ring topology for packet communication, in which the controller is connected to one of the plurality of battery packs and another of the plurality of battery packs for forming a ring single continuous pathway for a packet through each of the controller and the plurality of battery packs, wherein
the controller sends a fixed-length packet divided into segments so as to flow in one direction on the communication path, the number of segments being equal to or more than the number of battery packs, and
each of the plurality of battery packs stores data related to the battery pack in a segment assigned to the battery pack in the fixed-length packet received from a battery pack preceding in the communication path and sends the fixed-length packet to a succeeding battery pack.

2. The rechargeable battery system according to claim 1, wherein
the controller sends to the communication path a fixed-length packet in which dummy data is stored in a segment.

3. The rechargeable battery system according to claim 1, wherein
each of the plurality of battery packs generates the data related to the battery pack by combining a bit that should be transmitted and a bit obtained by inverting the bit that should be transmitted.

4. The rechargeable battery system according to claim 1, wherein
the controller sends data recorded in the fixed-length packet returned from the plurality of battery packs via the communication path to the communication path as the dummy data in the subsequent fixed-length packet.

5. The rechargeable battery system according to claim 1, wherein
the controller causes each of the plurality of battery packs to stores data including physical parameters measured in the battery pack in a segment assigned to the battery pack in the fixed-length packet received from a battery pack preceding in the communication path and send the fixed-length packet to a succeeding battery pack.

* * * * *